US010332182B2

(12) United States Patent
Zamir

(10) Patent No.: US 10,332,182 B2
(45) Date of Patent: Jun. 25, 2019

(54) AUTOMATIC APPLICATION LAYER SUGGESTION

(71) Applicant: VMware, Inc., Palo Alto, CA (US)

(72) Inventor: Tal Zamir, Haifa (IL)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 14/194,356

(22) Filed: Feb. 28, 2014

(65) Prior Publication Data

US 2015/0248282 A1  Sep. 3, 2015

(51) Int. Cl.
*G06Q 30/06* (2012.01)
*G06F 8/65* (2018.01)
*G06F 8/61* (2018.01)
*H04W 4/50* (2018.01)
*H04W 4/60* (2018.01)
*H04W 4/00* (2018.01)
H04W 80/12 (2009.01)

(52) U.S. Cl.
CPC .......... *G06Q 30/0631* (2013.01); *G06F 8/61* (2013.01); *G06F 8/65* (2013.01); *H04W 4/001* (2013.01); *H04W 4/003* (2013.01); *H04W 4/50* (2018.02); *H04W 4/60* (2018.02); *H04W 80/12* (2013.01)

(58) Field of Classification Search
CPC ................. G06F 8/60–71; G06Q 30/0631
USPC .................. 717/120, 121, 168–178
See application file for complete search history.

(56) References Cited

U.S. PATENT DOCUMENTS

| 5,860,012 | A | 1/1999 | Luu |
| 6,535,915 | B1* | 3/2003 | Valys et al. .................... 709/222 |
| 7,356,679 | B1* | 4/2008 | Le ..................... G06F 17/30067 |
| | | | 707/E17.01 |
| 7,627,745 | B2 | 12/2009 | Martinez et al. |
| 8,095,511 | B2 | 1/2012 | Zwilling |

(Continued)

OTHER PUBLICATIONS

Kurihara, S., et al., Context-aware application prediction and recommendation in mobile devices, Proceedings of the IEEE/WIC/ACM International Joint Conferences on Web Intelligence and Intelligent Agent Technologies, 2013, pp. 494-500, [retrieved on Feb. 14, 2019], Retrieved from the Internet: <URL:http://dl.acm.org/>.*

(Continued)

*Primary Examiner* — Geoffrey R St Leger

(57) ABSTRACT

A desktop management system is described that provides an automated process for distributing and suggesting modifications. The system is comprised of a central server and multiple client devices connected through a network. Application layer drafts for a particular modification (such as an installation, update, un-installation, fix, etc.) are generated based on snapshots of client devices before and after the modification is applied. Several application layer drafts are produced for a particular modification. Based on commonalities between the several application layer drafts, an official application layer is produced. When a client device requests a modification, an official application layer for the requested modification is retrieved and merged onto the requesting client device to apply the modification. If a client device on the network lacks an application that is present on similar client devices on the network, the system can suggest the application to the client device.

20 Claims, 7 Drawing Sheets

(56) References Cited

U.S. PATENT DOCUMENTS

| | | | |
|---|---|---|---|
| 8,112,505 B1 | 2/2012 | Ben-Shaul et al. | |
| 8,301,874 B1 | 10/2012 | Heidingsfeld et al. | |
| 8,365,164 B1 | 1/2013 | Morgenstern | |
| 8,572,587 B2 | 10/2013 | DeHaan | |
| 8,620,914 B1* | 12/2013 | Noth et al. | 707/732 |
| 8,793,681 B2* | 7/2014 | Ayachitula et al. | 717/171 |
| 8,935,393 B1* | 1/2015 | Jackson | G06Q 30/0631 709/224 |
| 8,954,951 B1* | 2/2015 | Cohen | G06F 8/65 717/168 |
| 8,966,471 B2 | 2/2015 | Boudreau | |
| 9,262,193 B2 | 2/2016 | Hicks | |
| 2004/0267835 A1 | 12/2004 | Zwilling | |
| 2005/0027831 A1 | 2/2005 | Anderson | |
| 2005/0108704 A1 | 5/2005 | Marinelli | |
| 2006/0020937 A1 | 1/2006 | Schaefer | |
| 2007/0011672 A1 | 1/2007 | Bhide | |
| 2007/0038895 A1 | 2/2007 | Biegert | |
| 2008/0126773 A1 | 5/2008 | Martinez et al. | |
| 2008/0195693 A1* | 8/2008 | Gao | G06F 8/65 709/202 |
| 2008/0307407 A1* | 12/2008 | Wagner | G06F 8/61 717/172 |
| 2009/0210870 A1* | 8/2009 | Clark | G06F 9/445 717/178 |
| 2009/0325712 A1* | 12/2009 | Rance | A63F 13/12 463/42 |
| 2010/0031251 A1 | 2/2010 | Hsieh | |
| 2010/0159898 A1* | 6/2010 | Krzyzanowski | G06F 9/452 455/414.1 |
| 2010/0223610 A1 | 9/2010 | DeHaan | |
| 2010/0275252 A1 | 10/2010 | Yun | |
| 2011/0283271 A1 | 11/2011 | Ingles | |
| 2011/0307354 A1* | 12/2011 | Erman | G06F 8/60 705/27.1 |
| 2012/0331455 A1* | 12/2012 | Ayachitula et al. | 717/171 |
| 2013/0124327 A1* | 5/2013 | Doughty | G06Q 30/0269 705/14.64 |
| 2013/0132896 A1* | 5/2013 | Lee | G06F 16/907 715/808 |
| 2013/0132942 A1 | 5/2013 | Wang | |
| 2013/0159995 A1* | 6/2013 | Senot | G06F 8/60 717/178 |
| 2013/0212161 A1 | 8/2013 | Ben-Shaul et al. | |
| 2013/0212579 A1 | 8/2013 | Ben-Shaul et al. | |
| 2013/0219286 A1 | 8/2013 | Ben-Shaul et al. | |
| 2013/0346494 A1* | 12/2013 | Nakfour | H04L 67/1095 709/204 |
| 2014/0052683 A1* | 2/2014 | Kirkham | G06Q 30/0631 706/46 |
| 2014/0095601 A1* | 4/2014 | Abuelsaad | G06F 9/5072 709/204 |
| 2014/0157262 A1 | 6/2014 | Hicks | |
| 2014/0298315 A1 | 10/2014 | Boudreau | |
| 2014/0372560 A1 | 12/2014 | Spottswood | |
| 2015/0278692 A1* | 10/2015 | Milewski | A63F 13/12 706/46 |

OTHER PUBLICATIONS

Maciel, C., et al., Context-Aware Collector, 2013 IEEE 10th International Conference on High Performance Computing and Communications, Nov. 13-15, 2013, pp. 2181-2186, [retrieved on Feb. 14, 2019], Retrieved from the Internet: <URL:http://ieeexplore.ieee.org/>.*

Koan, R. M., et al., It Takes a Village to Build an Image, Proceedings of the 31st annual ACM SIGUCCS fall conference, 2003, pp. 200-207, [retrieved on Nov. 2, 2018], Retrieved from the Internet: <URL:http://dl.acm.org/>.

Li, J., et al., iROW: An Efficient Live Snapshot System for Virtual Machine Disk, IEEE 18th International Conference on Parallel and Distributed Systems, 2012, pp. 376-383, [retrieved on Nov. 2, 2018], Retrieved from the Internet: <URL:https://ieeexplore.ieee.org/document/6413673>.

* cited by examiner

AUTOMATIC APPLICATION LAYER SUGGESTION

TECHNICAL FIELD

The present disclosure generally relates to techniques for modifying or updating software and other content on computer devices on a network.

BACKGROUND

Enterprise desktop management is one of the most challenging tasks for Information Technology (IT) departments of large organizations today. A typical IT department needs to manage, protect, and distribute software updates and modifications, upgrade operating systems and applications, as well as be able to back up and restore the user's data and settings on demand. One issue for IT departments is the complexity of managing a large number of different computers of enterprise users. The sheer number of user computers to manage; the proliferation of operating system (OS) images and applications; and the complex set of operations, such as deployment, provisioning, patching, upgrading, installing and managing applications, compliance testing, troubleshooting and re-imaging; all make IT responsibilities a very challenging task. To compound these difficulties, today's enterprises are often dispersed over multiple geographic locations and the use of Local Area Networks (LANs) connected over one or more Wide Area Networks (WANs) with variable bandwidths and latencies is a serious barrier to providing efficient network management without sacrificing end user experience.

In a typical enterprise network environment, it would be desirable for an IT department to manage client devices remotely to provide updates, install applications, and perform other IT functions for the client devices. A client device on the network can be a physical machine, such as a computer, a laptop, or a tablet where all of a user's data and applications are stored or hosted.

Enterprise desktop management provides a more centralized and efficient client environment that is easier to manage by enterprise IT administrators, who are able to respond more quickly to the changing needs of the user and the business. However, many issues still persist. For example, each time an IT administrator installs an application on a user device, the administrator may need to run an installer, which is time consuming and can require manual assistance. Further, in a network with a large numbers of users and client devices, an IT administrator can face challenges in determining which applications should be suggested to which users. A more efficient approach is desirable for managing client devices and suggesting applications on an enterprise network.

DETAILED DESCRIPTION

Figure 1:
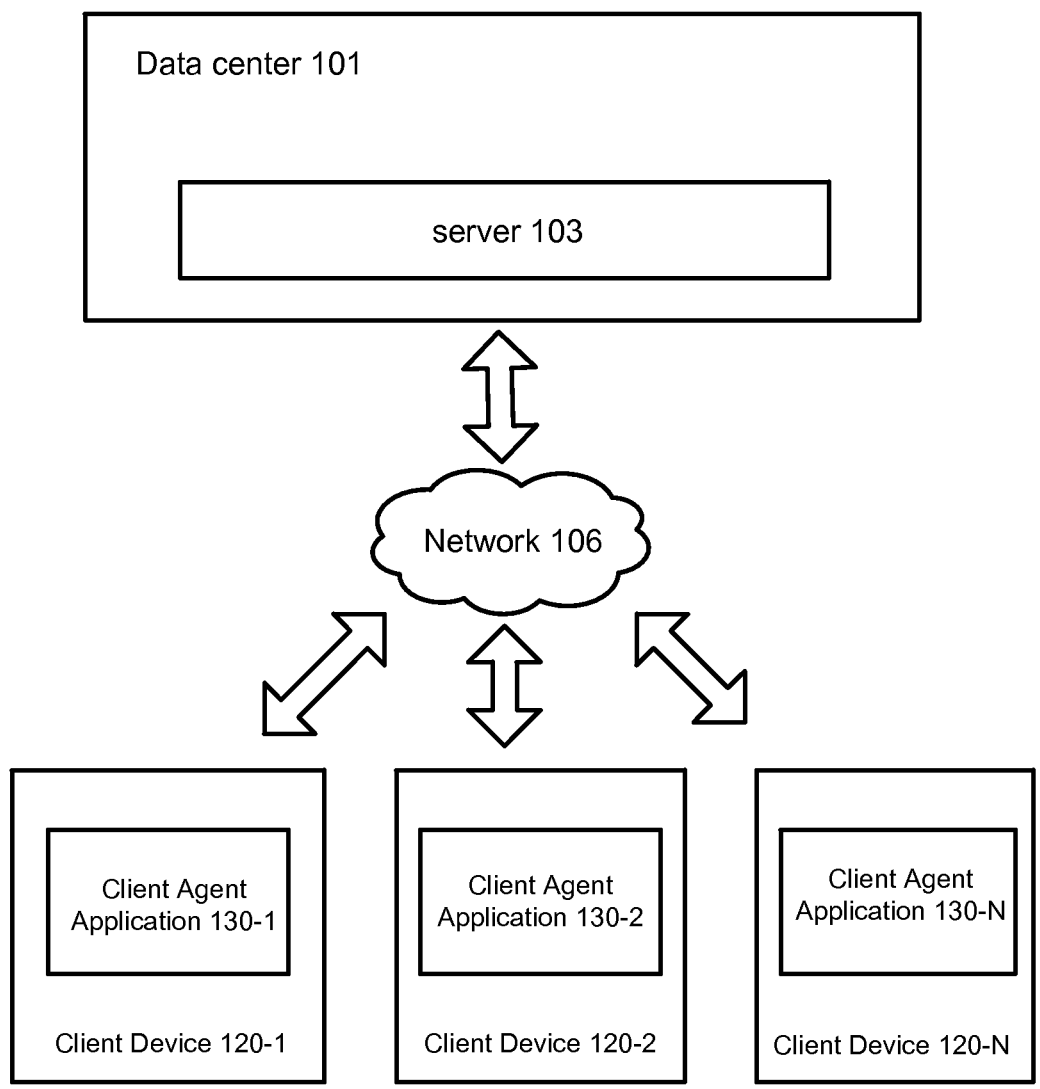
FIG. 1 illustrates an example of an enterprise desktop environment, in accordance with various embodiments.

Systems and methods in accordance with various embodiments of the present disclosure overcome at least some of the above mentioned shortcomings and deficiencies by providing more efficient ways to manage client devices in enterprise environments. In particular, embodiments described herein improve the efficiency of delivering updates, changes, and/or new software installations to client devices. Also, embodiments described herein provide efficient ways of suggesting updates, changes, and/or new software installations to users on the network.

As used herein, the term "enterprise network" refers to a system of multiple client devices that are centrally managed. A client device can be either a physical machine or, in a virtual network environment, a virtual machine. For example, a client device can be a physical machine, such as a computer, a laptop, or a tablet where all of a user's data and applications are stored and accessed on the client device by the user. The client device can communicate with a central server that might be hosted in a data center (or other location) over a remote network connection, such as a WAN connection, to enable IT administrators to carry out management functions such as updates, installations, backups, and other modifications and services. An agent application on each client device can enable the communication with the central server such that instructions, requests, and/or data can be communicated between the central server and the client devices.

Alternatively, in some embodiments, the client device can be a virtual machine in a virtual enterprise desktop environment such as Virtual Desktop Infrastructure (VDI). In the virtual environment, each user is provisioned a virtual desktop and is allowed to access his or her virtual desktop over a remote network connection, such as a WAN connection. Numerous virtual desktops can be executed and managed in a single central location (e.g., in a data center) and accessed by users remotely. It is noted that, in these virtual environment embodiments, a "client device" can be a virtual machine that is being executed on a host server inside of a data center, which can be accessed by a user over the network.

As used herein, the term "desktop" refers to a computing environment in which a user can launch, interact with, and manage the user's applications, settings, and data. As used herein, the term "virtual desktop" refers to an instance of an operating system or application that runs remotely with respect to the user, e.g., on the host server system in a remote datacenter. In a conventional VDI environment, each virtual desktop corresponds to a virtual machine (VM) executed on a host server (i.e., a host computing device). A host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user that owns the virtual desktop can remotely log into their virtual desktop using a device that establishes a network connection (e.g., Wide Area Network connection) with the host server and remotely execute various applications on the virtual machine as if the desktop was running on the user's local machine.

The desktop management system described herein can improve the performance and efficiency of applying modifications to client devices on a network. As used herein, the term "modification" refers to changes that an IT administrator may wish to apply to the desktop of a client device on a network, such as updates, installations, migrations to new operating systems, fixes, patches, un-installations, changes in setting, changes in configurations, etc. Further, the desktop management system described herein can improve the performance and efficiency of providing suggestions of applications to client devices on a network.

The desktop management system is comprised of many client devices and a central server that might be located in a data center. Users of the network can access client devices either directly or, for example in a virtual environment, through a remote interface. Each client device can be centrally managed by the server to perform operations on the client device such as updates, installations of applications, un-installations of applications, fixes, changes in settings, migration to different operating systems, etc. The server may be physically located in a data center or any other location of the enterprise.

In various embodiments, the desktop management system can provide an automated process for creating an application layer draft for a particular modification based on snapshots of a client device before and after the modification is applied. Several application layer drafts can be produced for a particular modification by comparing snapshots taken on multiple client devices that have applied the modification. Based on commonalities between the several application layer drafts, the system can produce an official application layer. Official application layers can be produced for various modifications and stored in a library of official application layers. The library can be stored on the server. When a client device on the network requests a modification, the system can retrieve an official application layer for the requested modification from the library and apply the modification to the requesting client device by merging the official application layer onto the requesting client device.

The desktop management system can identify groups of similar client devices for a particular target client device on the network and determine which applications are used by each client device in the group of similar client devices. The system can identify a preferred application that is missing from the target client device but appears on, or is often used on, the client devices in the group of similar client devices. The preferred application can be suggested to the client device. If the client device accepts the suggestion, the system can retrieve an official application layer draft for the preferred application from the library and install the preferred application on the client device by merging the official application layer onto the client device.

In various embodiments, a request to apply a modification on a client device can be received. For example, such a request can be initiated by a user of the client device or by the IT department of an organization. A first snapshot of the client device desktop can be produced before the modification is applied. As used herein, the term "snapshot" refers to capturing the state of a desktop on the client device, including files, registry entries, and/or database contents. For example, such a snapshot can be a Windows Volume Snapshot Service (VSS) snapshot that is automatically generated before every installation, for rollback purposes. After the first snapshot is generated, the snapshot can be recorded and the system can wait for the modification to be applied. A second snapshot can be generated after the modification has been applied. For example, the system can monitor the events on the client device, such as events in Windows, and take a snapshot once the system detects that the modification, such as an installation of a new application, has been completed.

After the pre-modification and the post-modification snapshots have been generated, an application layer draft can be created based on the pre-modification and the post-modification snapshots. For example, the system can determine the differences in the snapshots, such as differences in the file system, registry entries, and databases of each snapshot, and the application layer draft can be comprised of such differences. As used herein, the term "layer" refers to files, registry entries, database entries, and/or other data that can be merged onto a client device in order to apply a modification on that client device. For example, a layer for a corresponding modification may contain the files, registry entries, and database entries that need to be added, removed, or modified on a client device to apply the modification on the client device. Merging the layer onto the client device applies the corresponding modification to the client device by making the changes to the files, registry entries, and/or databases of the client device that are required to apply the modification.

For example, when merging a layer onto a client device, the system can view the files, registry entries, and database entries of the client device and compare them to the files, registry entries, and database entries in the layer. Based on the comparison, the system can determine which files should be added to the client device, which files should be deleted from the client device, and/or which files on the client device should be overwritten by files in the layer. Similarly, based on the comparison, the system can determine which registry entries and database contents should be changed in the merge. A draft of how the client device desktop will look after the merge can be produced based on the comparison and the actual changes can be implemented to complete the merge when the user restarts the client device. The files, database entries, and/or registry entries can be stored in a side folder and the changes can be implemented when the user restarts the client device. This methodology allows for modifications to be applied to the client device seamlessly and with little interruption and downtime, as opposed to traditional methods such as executable installers, which can require the user to stop tasks, slow down the machine, and require manual assistance from the user or from IT administrators.

In various embodiments, noise, such as random data, temporary areas, or device-specific information can be removed from an application layer draft or from a pre-modification or post-modification snapshot, before the snapshot is used to create an application layer draft. Ideally, the application layer draft will contain only the information necessary to apply the modification to a client device when the application layer draft is merged. Otherwise, the merge may result in unwanted effects or may be otherwise inefficient. For example, additional processes may be occurring on a client device that cause changes to the desktop in addition to the changes caused by the applied modification. As a result, the application layer draft may contain undesirable information, or noise, related to changes caused by the additional processes, which is ideally removed. Accordingly, any information that is known to be unnecessary for such a merge can be removed either from the snapshots or from the application layer draft. For example, noise can be information that is generated by random events on the client device, for example random applications running on the client device while the modification is applied. Noise can also be data that is specific to the user or to the client device. In various embodiments, noise can be identified by its location on the client device; hence, data in certain predetermined locations can be determined to be noise and eliminated from either the snapshots or the application layer draft. For example, noise can include temporary files, temporary locations, temporary directory locations, temporary registry changes, user locations, or cache directories of certain applications and operating systems.

After a particular modification has been applied on several (e.g., at least two) different client devices, a corresponding application layer draft can be generated for each instance of a modification on a client device, and the several application layer drafts can be used to create an official application layer based on commonalities between the several application layer drafts. For example, because each application layer draft might originate from a unique machine, even after removal of noise and other unnecessary information, the application layer draft may contain information that is undesirable when merging the layer onto another client device. Such information may vary between application layer drafts from different machines; accordingly, varying portions among the application layer drafts can be removed and common portions among the application layer drafts can be retained.

For example, the several application layer drafts can be compared to each other and information that is common to all application layer drafts can become part of the official application layer. Information that is different between each application layer draft can be filtered out of the official application layer. Further, information in predetermined locations, or predetermined types of information, such as temporary areas and user areas, can be filtered out of the official application layer. By retaining information that is common to all application layer drafts and removing information that varies between the drafts or that is known to be unnecessary, an official application layer can be produced that, when merged onto another client device, will transfer necessary changes onto the client device to apply the modification that corresponds to the official application layer without making unintended or unnecessary changes to the client device.

For example, a particular application can be installed on several client devices and an application layer draft can be generated from each installation of the application. The application layer drafts can be compared to each other and an official application layer can be generated that includes certain common data between the application layer drafts and excludes other data that varies between the application layer drafts or that is in predetermined locations known to be unnecessary.

Once an official application layer for a corresponding modification has been generated, the official application layer can be stored in a library of official application layers. The library can contain official application layers for numerous modifications, such as for installations of applications, updates of applications, un-installations of applications, software patches and fixes, and other modifications. The library can be located at a centralized location, such as on a server in a data center, which can communicate with client devices on the network. When a client device on the network needs a particular modification, the client device can send a request for the modification to the server. The system can access the library and retrieve an official application layer for the requested modification. The layer can be merged onto the requesting client device to apply the modification onto the client device.

Accordingly, in various embodiments, the desktop management system can provide an automated process for creating an application layer draft for a particular modification based on snapshots of a user device before and after the modification is applied. Several application layer drafts can be produced for a particular modification. Based on commonalities between the several application layer drafts, the system can produce an official application layer. Official application layers can be produced for various modifications and stored in a library of official application layers. When a client device on the network requests a modification (or when an IT administrator decides to apply a modification to a device), the system can retrieve an official application layer for the modification from the library and apply the modification on the requesting client device by merging the official application layer onto the requesting client device.

By providing an automated method for creating application layers for modifications, and for merging the layers onto client devices to apply the modifications, the system can overcome several disadvantages of traditional methods. For example, in traditional environments, to install an application or an update, an installer is run on the client device. The installer can require execution of several operations, manual inputs, downtime, and the user of the client device may need to stop processes. As such, an IT administrator that wishes to conventionally install an application on a user's device (e.g., employee's laptop) would need physical possession of the user's device, or at least some form of remote access to the device. The installation process may fail and it may slow down the client device. In various embodiments described herein, the IT administrator can deploy an application on the user's device by merging a corresponding official application layer, all of which can avoid the need to run installation logic or execute an installation each time a client device requires installation new application. This process can be more robust, produce less interference with operation of client devices, reduce downtime, and be more network-optimized.

In various embodiments, the desktop management system described herein can also improve the performance and efficiency of providing suggestions of applications for client devices on the network. For each client device on the network, the system can determine the device's profile that indicates which applications are used by the client device. The system can also observe activity on each client device to obtain information about the client device's use of any application, such as the frequency with which an application is used on the device (e.g., how many times per day or per week the application is used by the device), or information about the amount of time an application is used on the client device (e.g., how many hours per day, how many hours per week, how many hours on average, or how many hours of continuous use).

The system can analyze client devices on the network and determine when a particular target client device lacks a preferred application that is used by a group of similar client devices. For example, such a preferred application can be a new application, a configuration of an application, an update to an existing application, or a software patch to an application. The system can then suggest the preferred application to the target client device, such as by transmitting a message to the device, indicating that the user may be interested in the suggested application. When a confirmation is received from the target client device to apply the preferred application, for example such a confirmation can originate from inputs of a user of the client device, the system can retrieve an official application layer corresponding to the preferred application from the library and apply the preferred application onto the target client device by merging the official application layer corresponding to the preferred application onto the target client device. In this way, applications can be suggested and applied to client devices efficiently and without involvement from the IT department.

In various embodiments, the system can identify a group of similar client devices on the network with respect to a target client device based on various characteristics about the client devices. Such characteristics can include the particular applications used by client devices, the frequency with which certain applications are used by client devices, the periods of time for which certain applications are used by client devices, and profile information about client devices or about users of client devices. For example, the system can identify a set of applications that are present on the target client device and determine a group of similar client devices that contain the same set of applications. In various embodiments, the system can identify a set of applications that are used on the target client device with a certain frequency (for example, daily) or for certain amounts of time (for example, at least thirty minutes per day) and determine a group of similar client devices that use the same set of applications with a certain frequency (which can be different than the frequency with which the application is used on the target client device) or for certain amounts of time (which can be different than the amounts of time for which the application is used on the target client device). In various embodiments, other profile information about client devices can be used to determine a group of similar client devices to a target client device, such profile information can include characteristics such as the type of machine that is the client device (what brand the device is, whether it is a tablet, whether it is a smartphone, etc.), primary functions of the users of the client device (engineering, marketing, sales, administration, etc.), personal profile information about the users of the client device (age, hobbies, personal interests, etc.), geographic location, and any other information that relates to a client device.

For example, the system can identify that a particular target client device belongs to a software developer and uses applications A, B, and C daily, for at least 3 hours per day. The system can search through other client devices on the network and find that a group of similar client devices belonging to other software developers (e.g., three other software developers) that use applications A, B, and C daily, for at least 2 hours per day and also use application D daily for at least one hour per day. Based on this, the system can suggest to the target client device to install application D. If the target client device confirms the installation, the system can retrieve the official application layer for application D and install the application onto the target client device by merging the official application layer onto the target client device. In this way, suggestions of applications can be automatically generated for client devices on the network and the applications can be installed to the client devices, all without involvement from the IT department.

FIG. 1 illustrates an example of a enterprise desktop environment, in accordance with various embodiments. The enterprise desktop environment includes multiple client devices (120-1, 120-2, 120-N) that can be centrally managed through a server 103 that is communicatively coupled with client devices (120-1, 120-2, 120-N) via a network 106. The server 103 may be located in a data center 101, or any other location of the enterprise. An agent application (130-1, 130-2, 130-N) on each client device (120-1, 120-2, 120-N) can enable communication between the server 103 in the data center 101 and the client devices (120-1, 120-2, 120-N) such that information such as instructions, requests, and/or data can be communicated between the server 103 and the client devices (120-1, 120-2, 120-N). Network 106 may further include numerous other components, such as one or more firewalls, connection brokers, management servers, etc., which are not shown here so as to not obscure salient features of the enterprise desktop environment. A client device (e.g., 120-1, 120-2, 120-N) can be either a physical machine or, in a virtual network environment, a virtual machine. For example, a client device (e.g., 120-1, 120-2, 120-N) can be a physical machine, such as a computer, a laptop, or a tablet where all of a user's data and applications are stored and accessed directly on the client device by the user. A client device (e.g., 120-1, 120-2, 120-N) can communicate with the server 103 over a remote network connection 106, such as a WAN connection, to carry out management functions such as updates, installations, backups, and other modification and services. Alternatively, the client device (e.g., 120-1, 120-2, 120-N) can be a virtual machine in a virtual enterprise network environment such as Virtual Desktop Infrastructure (VDI). In the virtual environment, each user is provisioned a virtual desktop and is allowed to access his or her virtual desktop over a remote network connection 106, such as a WAN connection. Numerous virtual desktops can be executed and managed in a single central location and accessed by users remotely. It is noted that, as used herein, a "client device" (e.g., 120-1, 120-2, 120-N) can be a physical machine or a virtual machine. Each client device (e.g., 120-1, 120-2, 120-N) can be centrally managed by the server 103 to perform operations on the client device (e.g., 120-1, 120-2, 120-N) such as updates, installations of applications, un-installations of applications, fixes, changes in settings, and migration to different operating systems for users of client devices (e.g., 120-1, 120-2, 120-N).

It should be noted that the particular network deployment illustrated in FIG. 1 is shown purely for purposes of illustration and is not intended to be in any way inclusive or limiting to the embodiments that are described herein. For example, a typical data center would include many other types of devices, such as switches, power supplies, databases, cooling systems and other environmental controls, and the like, which are not illustrated herein. Similarly, the server may not be located in a data center and might instead be located in the workplace/offices of the enterprise. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
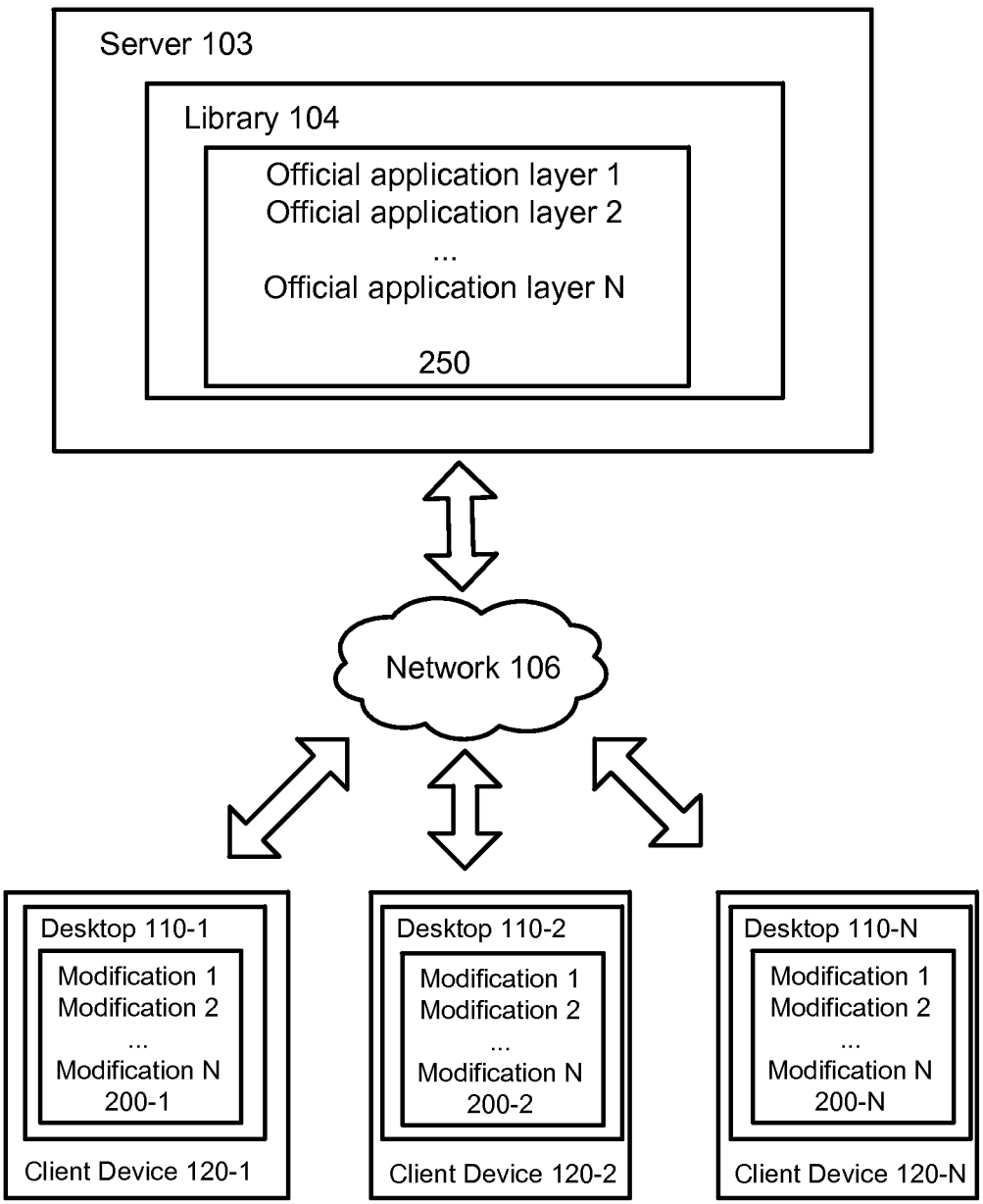
FIG. 2 provides an example of a desktop management system, according to various embodiments.

FIG. 2 provides an example of a desktop management system, according to various embodiments. As illustrated in the example of FIG. 2, a desktop (e.g., 110-1, 110-2, 110-N) on each client device (e.g., 120-1, 120-2, 120-N) on the network 106 can contain a series of modifications (200-1, 200-2, 200-N) that have been applied to the desktop (e.g., 110-1, 110-2, 110-N), such as installations of applications, updates, fixes, etc. When a modification (e.g., 200-1, 200-2, 200-N) is applied on a client device (e.g., 120-1, 120-2,

120-N), a first snapshot of the client device desktop (e.g., 110-1, 110-2, 110-N) can be produced before the modification (e.g., 200-1, 200-2, 200-N) is applied. After the first snapshot is generated, the modification (e.g., 200-1, 200-2, 200-N) can be applied and a second snapshot of the desktop (e.g., 110-1, 110-2, 110-N) can be generated after the modification (e.g., 200-1, 200-2, 200-N) has been applied. After the pre-modification and the post-modification snapshots have been generated, an application layer draft can be created based on the pre-modification and the post-modification snapshots. For example, the system can determine the differences between the pre-modification and the post-modification snapshots, such as differences in the file system, registry entries, and databases of each snapshot, and the application layer draft can be comprised of such differences. Noise, such as random data, temporary areas, or device-specific information can be removed from an application layer draft or from a pre-modification or post-modification snapshot, before the snapshot is used to create an application layer draft.

After a particular modification (e.g., 200-1, 200-2, 200-N) has been applied on several (at least two) different client devices (e.g., 120-1, 120-2, 120-N), a corresponding application layer draft can be generated for each modification (e.g., 200-1, 200-2, 200-N) on a client device (e.g., 120-1, 120-2, 120-N), and the several application layer drafts can be used to create an official application layer based on commonalities between the several application layer drafts. By retaining information that is common to all application layer drafts and removing information that varies between the application layer drafts or that is known to be unnecessary, an official application layer can be produced that, when merged onto another client device, can apply the modification that corresponds to the official application layer to the client device.

Once an official application layer for a corresponding modification has been generated, the official application layer can be stored in a library 104 containing a set of official application layers 250. The library can contain official application layers 250 for numerous modifications, such as for installations of application, updates of applications, un-installations of applications, fixes of applications, and other modifications (e.g., 200-1, 200-2, 200-N). The library 104 can be located within a central location, such as a central server 103, that can communicate with client devices (e.g., 120-1, 120-2, 120-N) on the network 106. When a client device (e.g., 120-1, 120-2, 120-N) on the network 106 needs a particular modification (e.g., 200-1, 200-2, 200-N), the client device can send a request for the modification (e.g., 200-1, 200-2, 200-N) to the server 103. The system can access the library 104 and retrieve an official application layer for the requested modification (e.g., 200-1, 200-2, 200-N) from the set of application layers 250. The official application layer can be merged onto the requesting client device (e.g., 120-1, 120-2, 120-N) to apply the modification (e.g., 200-1, 200-2, 200-N) onto the client device (e.g., 120-1, 120-2, 120-N).

Accordingly, in various embodiments, the desktop management system can provide an automated process for creating an application layer draft for a particular modification (e.g., 200-1, 200-2, 200-N) based on snapshots of a user device (e.g., 120-1, 120-2, 120-N) before and after the modification (e.g., 200-1, 200-2, 200-N) is applied. Several application layer drafts can be produced for a particular modification. Based on commonalities between the several application layer drafts, the system can produce an official application layer. Official application layers 250 can be produced for various modifications and stored in a library 104 of official application layers 250. When a client device (e.g., 120-1, 120-2, 120-N) on the network 106 requests a modification (e.g., 200-1, 200-2, 200-N) (or when an IT administrator decides to apply the modification to a client device), the system can retrieve an official application layer for the modification from the library 104 and apply the modification (e.g., 200-1, 200-2, 200-N) on the requesting client device (e.g., 120-1, 120-2, 120-N) by merging the official application layer onto the requesting client device (e.g., 120-1, 120-2, 120-N).

Figure 3:
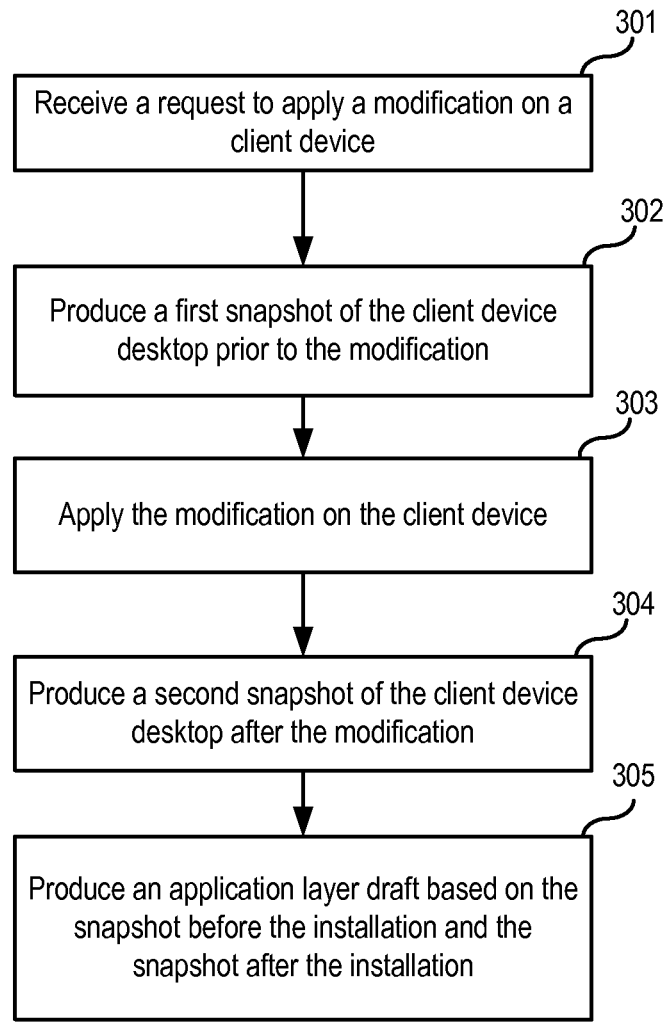
FIG. 3 illustrates an example of a process for producing an application layer draft, in accordance with various embodiments.

FIG. 3 illustrates an example of a process for producing an application layer draft, in accordance with various embodiments. As illustrated in the example process of FIG. 3, a request to apply a modification to a client device can be received 301. For example, such a request can be initiated by a user of the client device or by the IT department of an organization. A first snapshot of the client device desktop can be produced prior to the modification 302. For example, such a snapshot can be a Windows VSS snapshot that is automatically generated before every installation, for roll-back purposes. After the first snapshot is generated, the modification can be applied on the client device 303 and a second snapshot of the client device desktop can be produced after the modification has been applied 304. For example, the system can monitor the events on the client device, such as events in Windows, and take a snapshot once the system detects that the modification, such as completion of an installation, has been completed. After the pre-modification 302 and the post-modification 304 snapshots have been generated, the system can produce an application layer draft based on the snapshot before the installation and the snapshot after the installation 305. For example, the system can determine the differences in the snapshots, such as differences in the file system, registry entries, and databases of each snapshot, and the application layer draft can be comprised of such differences.

Noise, such as random data, temporary areas, or device-specific information can be removed from the application layer draft or from the pre-modification or post-modification snapshot, before the snapshot is used to create the application layer draft. For example, any information that is known to be unnecessary can be removed either from the snapshots or from the application layer draft. Noise can be data that is specific to the user or to the client device. In various embodiments, noise can be identified by its location on the client device; hence, data in certain pre-determined locations can be determined to be noise and eliminated from either the snapshots or the application layer draft. For example, noise can include temporary files, temporary locations, temporary directory locations, temporary registry changes, user locations, or cache directories of certain applications and operating systems.

Figure 4:
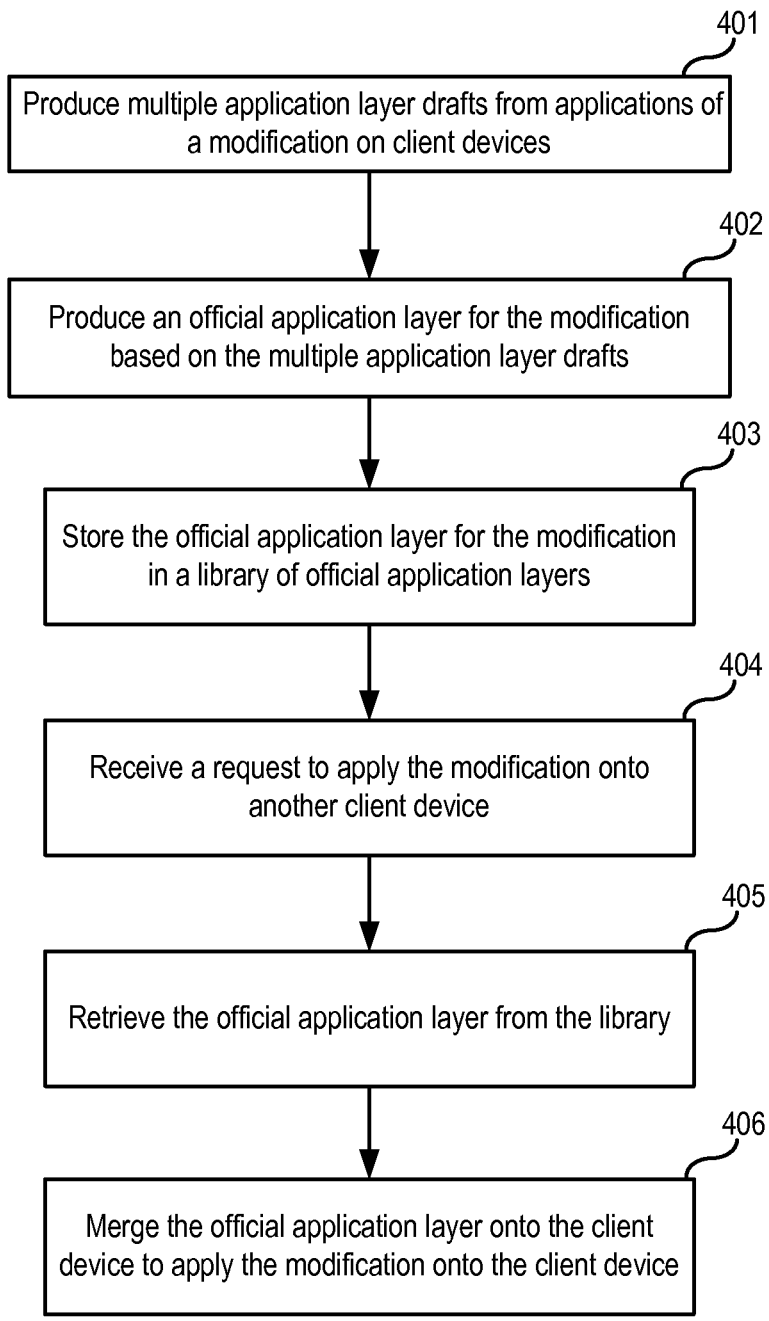
FIG. 4 illustrates an example of a process for producing an official application layer, in accordance with various embodiments.

FIG. 4 illustrates an example of a process for producing an official application layer, in accordance with various embodiments. As illustrated in the example of FIG. 4, the system can produce multiple application layer drafts from applications of a modification on client devices 401. For example, a particular modification, such as an installation of a particular application, can be performed on several client devices and a respective application layer draft can be produced from each such installation. An official application layer for the modification based on the multiple application layer drafts can be produced 402. For example, the several application layer drafts can be compared to each other and information that is common to all application layer drafts can become part of the official application layer. Information that is different between each application layer draft can be filtered out of the official application layer. Further, information in predetermined locations, or predetermined types of information, such as temporary areas and user areas, can be filtered out of the official application layer. By retaining information that is common to all application layer drafts and removing information that varies between the drafts or that is known to be unnecessary, an official application layer can be produced that, when merged onto another client device, will transfer necessary changes onto the client device to apply the modification that corresponds to the official application layer without making unintended or unnecessary changes to the client device. Thereafter, the system can store the official application layer for the modification in a library of official application layers 403. The system can receive a request to apply the modification onto another client device 404, such as a device requesting an installation of an application. The official application layer can be retrieved from the library 405 and merged onto the client device to apply the modification onto the client device 406.

Figure 5:
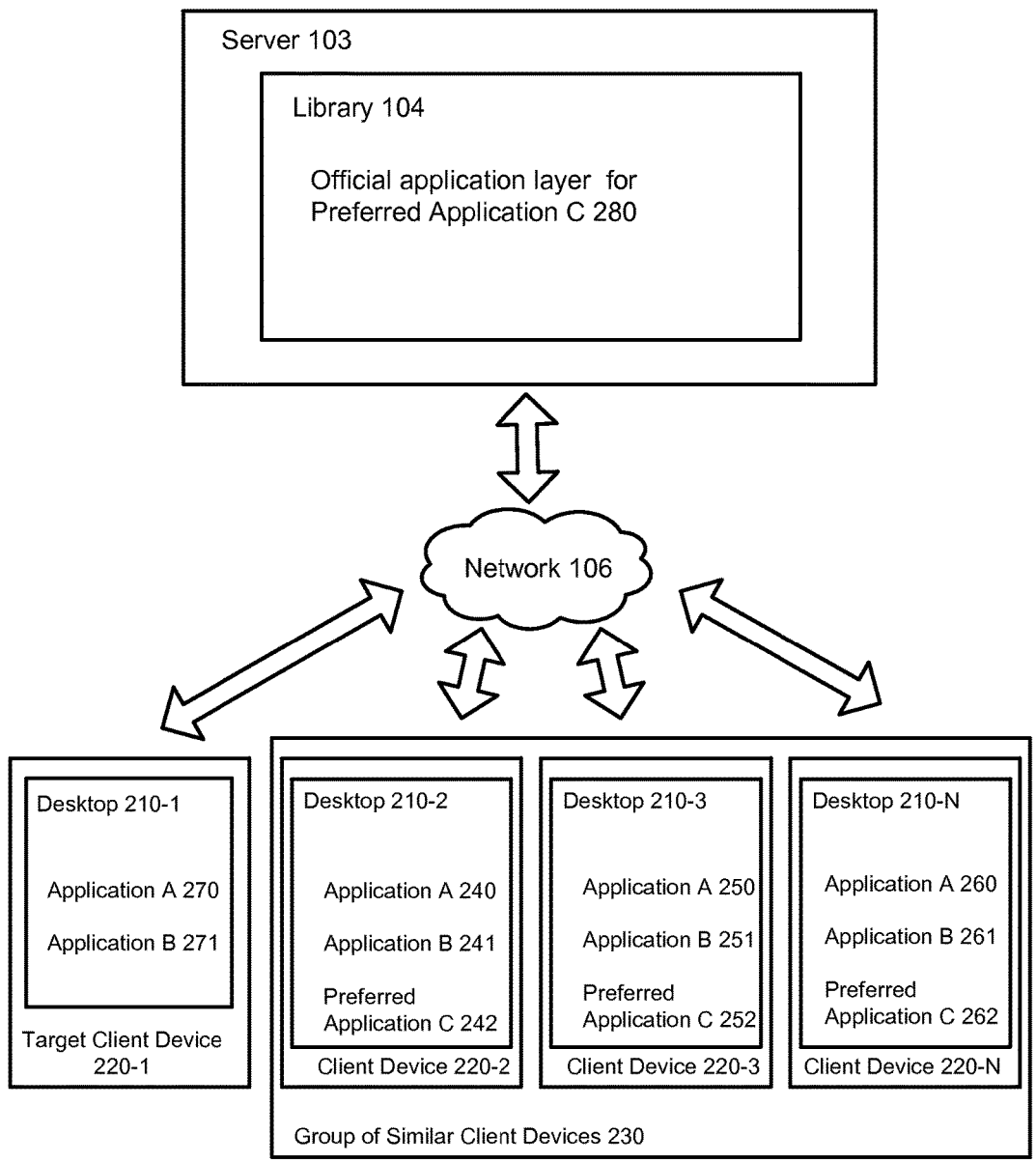
FIG. 5 illustrates an example of a system for providing suggestions of applications to client devices on the network, in accordance with various embodiments.

FIG. 5 illustrates an example of a system for providing suggestions of applications to client devices on the network, in accordance with various embodiments. As illustrated in the example of FIG. 5, desktops (e.g., 210-1, 210-2, 210-3, 210-N) of client devices (e.g., 220-1, 220-2, 220-3, 220-N) on the system contain several applications (e.g., 270, 271, 240, 241, 242, 250, 251, 252, 260, 261, 262). For each client device (e.g., 220-1, 220-2, 220-3, 220-N) on the network 106, the system can determine which applications (e.g., 270, 271, 240, 241, 242, 250, 251, 252, 260, 261, 262) are used by the client device (e.g., 120-1, 120-2, 120-N) by observing the client device (e.g., 220-1, 220-2, 220-3, 220-N). The system can also observe activity on a client device (e.g., 220-1, 220-2, 220-3, 220-N) to obtain information about the client device's (e.g., 220-1, 220-2, 220-3, 220-N) use of any application (e.g., 270, 271, 240, 241, 242, 250, 251, 252, 260, 261, 262), such as the frequency with which the application (e.g., 270, 271, 240, 241, 242, 250, 251, 252, 260, 261, 262) is used (e.g., how many times per day or per week the application is used by the device), or information about the amount of time the application (e.g., 270, 271, 240, 241, 242, 250, 251, 252, 260, 261, 262) is used (e.g., how many hours per day, how many hours per week, how many hours on average, or how many hours of continuous use). The system can analyze client devices (e.g., 220-1, 220-2, 220-3, 220-N) on the network 106 and determine when a particular target client device 220-1 lacks a particular preferred application (e.g., 242, 252, 262) that is used by a group of similar client devices 230. For example, such a preferred application (e.g., 242, 252, 262) can be a new application, an update to an existing application, or a repair of an application. The system can suggest the preferred application (e.g., 242, 252, 262) to the target client device 220-1. When a confirmation is received from the target client device 220-1 to install the preferred application (e.g., 242, 252, 262), for example such a confirmation can originate from inputs of a user of the client device, the system can retrieve an official application layer for the preferred application C 280 from a library 104 contained on the server 103 and apply the preferred application (e.g., 242, 252, 262) onto the target client device 220-1 by merging the official application layer for the preferred application C 280 onto the target client device 220-1. In this way, applications can be suggested and applied to client devices (e.g., 220-1, 220-2, 220-3, 220-N) efficiently and without involvement from the IT department.

For example, the system can identify that the target client device 220-1 is used by a software developer and uses applications A (270) and B (271), daily, for at least 3 hours per day. The system can search through other client devices on the network and identify that a group of similar client devices 230 belonging to other software developers (e.g., three other software developers) that use the same applications A (e.g., 240, 250, 260) and B (e.g., 241, 251, 261), daily, for at least 2 hours per day, also use preferred application C (e.g., 242, 252, 262) daily, for at least one hour per day. Based on this, the system can suggest to the target client device 220-1 to install preferred application C (e.g., 242, 252, 262). If the target client device confirms the installation, the system can retrieve the official application layer for preferred application C 280 and install application C (e.g., 242, 252, 262) onto the target client device 220-1 by merging the official application layer for preferred application C 280 onto the target client device 220-1. In this way, suggestions of applications can be automatically generated for client devices (e.g., 220-1, 220-2, 220-3, 220-N) on the network 106 and applications (e.g., 270, 271, 240, 241, 242, 250, 251, 252, 260, 261, 262) can be installed on the client devices (e.g., 220-1, 220-2, 220-3, 220-N), all without involvement from the IT department.

In various embodiments, the system can identify the group of similar client devices 230 on the network 106 with respect to the target client device 220-1 based on various characteristics about the client devices (e.g., 220-1, 220-2, 220-3, 220-N). For example, the system can identify a set of applications that are present on the target client device 220-1 and determine a group of similar client devices 230 that contain the same set of applications. In various embodiments, the system can identify a set of applications that are used on the target client device 220-1 with a certain frequency (for example, daily) or for certain amounts of time (for example, at least thirty minutes per day) and determine a group of similar client devices 230 that use the same set of applications with a certain frequency (which can be different than the frequency with which the application is used on the target client device 220-1) or for certain amounts of time (which can be different than the amounts of time for which the application is used on the target client device 220-1). In various embodiments, other profile information about client devices (e.g., 220-1, 220-2, 220-3, 220-N) can be used to determine a group of similar client devices 230 to a target client device 220-1, such profile information can include characteristics such as the type of machine that is the client device (device brand, tablet, smartphone, etc.), primary functions of the users of the client device (engineering, marketing, sales, administration, etc.), personal profile information about the users of the client device (age, hobbies, personal interests, etc.), geographic location, and any other information that relates to a client device.

Figure 6:
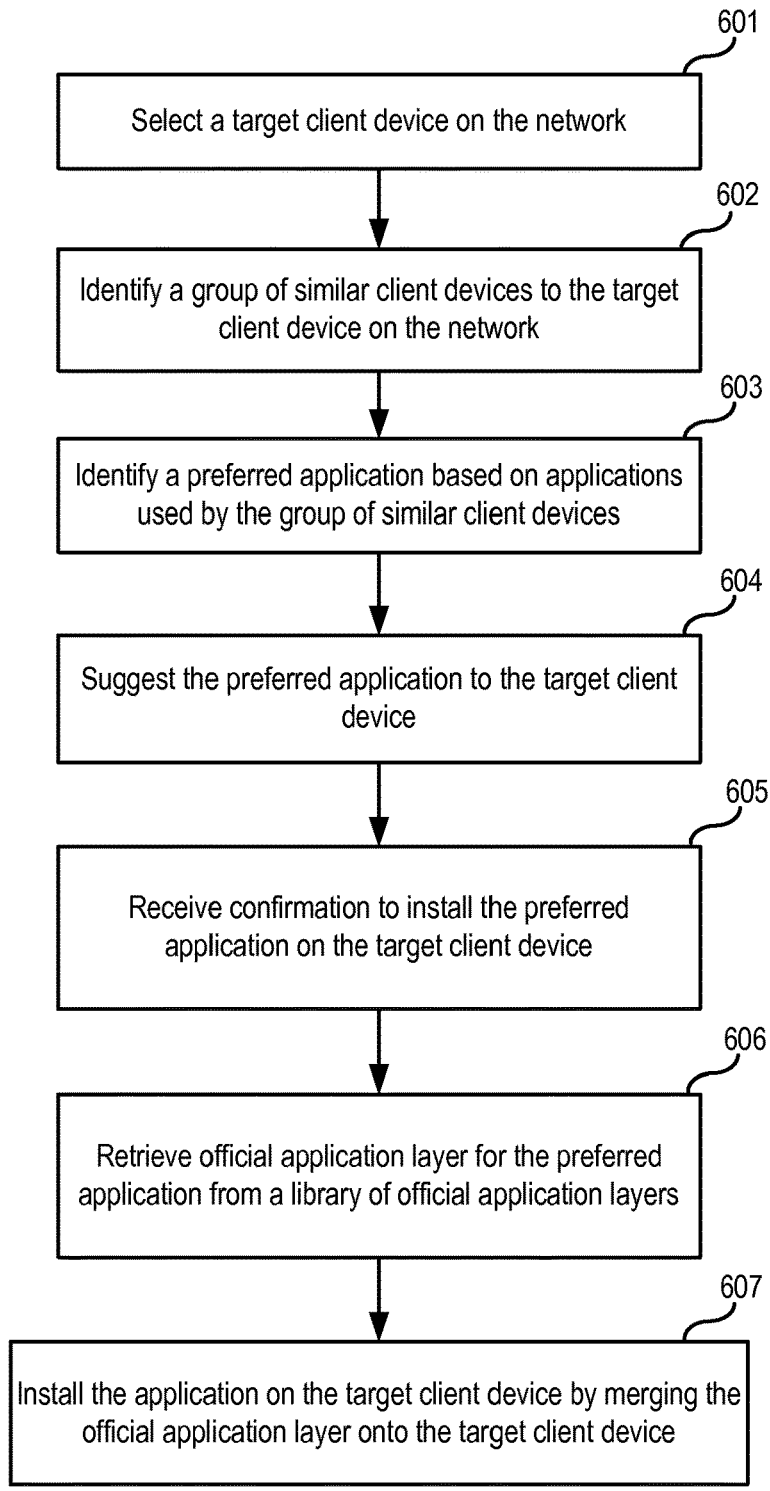
FIG. 6 illustrates an example of a process for providing suggestions of applications to client devices on the network, in accordance with various embodiments.

FIG. 6 illustrates an example of a process for providing suggestions of applications to client devices on the network, in accordance with various embodiments. As illustrated in the example process of FIG. 6, a target client device can be selected on the network 601. A group of similar client devices to the target client device can be identified on the network 602. In various embodiments, the system can identify a group of similar client devices to the target client device on the network 602 based on various characteristics about the client devices. Such characteristics can include the particular applications used by client devices, the frequency with which certain applications are used by client devices, the periods of time for which certain applications are used by client devices, and profile information about client devices or about users of client devices. After a group of similar client devices to the target client device on the network is identified 602, the system can identify a preferred application based on applications used by the group of similar client devices 603. For example, the preferred application can be an application that is used by a majority of client devices (for example, at least half the client devices) at a predetermined level of frequency (for example, daily), and for a certain predetermined amount of time (for example, at least an hour per day). The system can suggest the preferred application to the target client device 604. If a confirmation to install the preferred application on the target client device is received 605, then the system can retrieve an official application layer for the preferred application from a library of official application layers 606. The application can be installed on the target client device by merging the official application layer onto the target client device 607.

Figure 7:
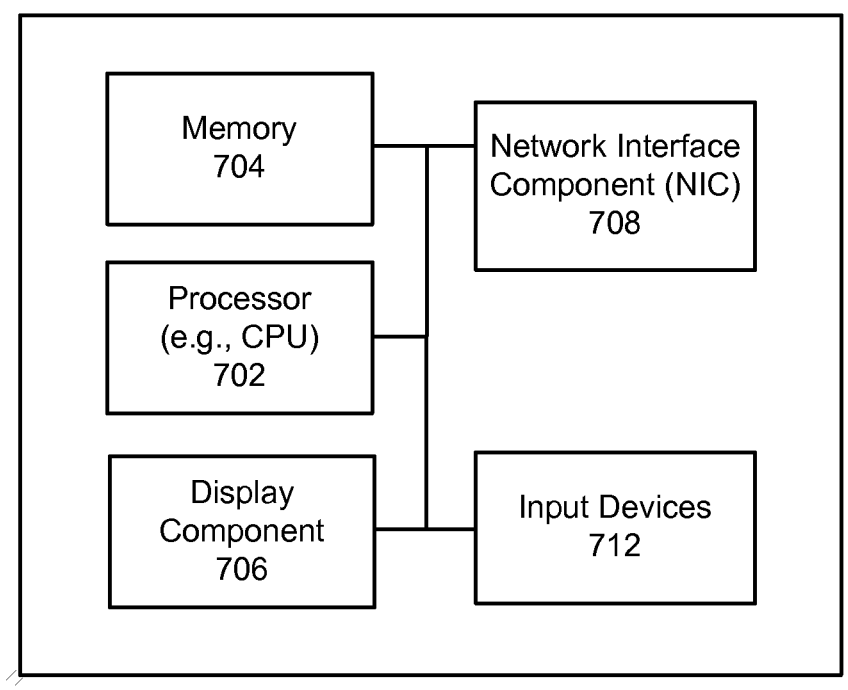
FIG. 7 illustrates an example of some general components of a computing device, in accordance with various embodiments.

FIG. 7 illustrates an example of some general components of a computing device, in accordance with various embodiments. In this particular example, the device includes one or more processors (e.g., central processing units (CPUs) 702 for executing instructions that can be stored in physical memory component 704. The memory component 704 can include many types of memory, data storage, or non-transitory computer-readable storage media, such as random access memory (RAM) storing program instructions for execution by the processor 702, a separate form of storage for images or data, a removable memory for sharing information with other devices and the like. The memory component 704 typically can further comprise a display component 706, such as a monitor, a touch screen, liquid crystal display (LCD), or the like. In various embodiments, the computing device will include at least one input device 708 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 708 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
selecting a target client device on a network, the network comprising a plurality of client devices centrally managed by a server, the server containing a library of official application layers, each official application layer relating to a corresponding application, wherein merging the official application layer onto a client device applies the corresponding application onto the client device, wherein the official application layers are captured from the plurality of client devices by the server and stored in the library;
identifying a group of similar client devices to the target client device on the network, the identifying the group of similar client devices comprising:
identifying a set of applications on the target client device that are used on the target client device with a minimum frequency;
identifying client devices in the plurality of client devices that use the applications in the identified set of applications with at least as high frequency as the minimum frequency;
determining which application of the applications for which corresponding official application layers are contained in the library is a preferred application for being installed on the target client device based on which applications are present on the similar client devices, wherein the preferred application is present on at least a subset of the group of similar client devices and is not present on the target client device; and
transmitting a message to the target client device, the message indicating which application out of the applications for which corresponding official application layers are contained in the library on the server is the preferred application for being installed on the target client device.

2. The method of claim 1, wherein identifying a group of similar client devices to the target client device on the network further comprises:
identifying a set of characteristics related to the target client device; and
identifying similar client devices based on the identified set of characteristics.

3. The method of claim 2, wherein the set of characteristics includes at least one of information about which applications are on the target client device, information about the amount of time applications are used on the target client device, and information about the frequency with which applications are used on the target client device.

4. The method of claim 2, wherein the set of characteristics includes profile information about the target client device.

5. The method of claim 1, further comprising:
receiving a confirmation from the target client device to install the preferred application; and
in response to receiving the confirmation, merging the official application layer on the target client device.

6. The method of claim 1, wherein an application is one of a software program, an update to a software program, or a patch to a software program.

7. The method of claim 1, wherein determining the preferred application is further based on at least one of the amount of time that the applications that are present on the similar client devices and not on the target client device are used on the similar client devices and the frequency with which the applications that are present on the similar client devices and not on the target client device are used on the similar client devices.

8. A computing device, comprising:
at least one processor; and
memory including instructions that, when executed by the at least one processor, cause the computing device to:
select a target client device on a network, the network comprising a plurality of client devices centrally managed by a server, the server containing a library of official application layers, each official application layer relating to a corresponding application, wherein merging the official application layer onto a client device applies the corresponding application onto the client device, wherein the official application layers are captured from the plurality of client devices by the server and stored in the library;
identify a group of similar client devices to the target client device on the network, the identifying the group of similar client devices comprising:
identifying a set of applications on the target client device that are used on the target client device with a minimum frequency;
identifying client devices in the plurality of client devices that use the applications in the identified set of applications with at least as high frequency as the minimum frequency;
determine which application of the applications for which corresponding official application layers are contained in the library is a preferred application for being installed on the target client device based on which applications are present on the similar client devices, wherein the preferred application is present on at least a subset of the group of similar client devices and is not present on the target client device; and
transmit a message to the target client device, the message indicating which application out of the applications for which corresponding official application layers are contained in the library on the server is the preferred application for being installed on the target client device.

9. The computing device of claim 8, wherein identifying a group of similar client devices to the target client device on the network further comprises:
identifying a set of characteristics related to the target client device; and
identifying similar client devices based on the identified set of characteristics.

10. The computing device of claim 9, wherein the set of characteristics includes at least one of information about which applications are on the target client device, information about the amount of time applications are used on the target client device, and information about the frequency with which applications are used on the target client device.

11. The computing device of claim 9, wherein the set of characteristics includes profile information about the target client device.

12. The computing device of claim 8, wherein the memory further includes instructions that, when executed by the at least one processor, cause the computing device to:
receive a confirmation from the target client device to install the preferred application; and in response to receiving the confirmation, merge the official application layer on the target client device.

13. The computing device of claim 8, wherein an application is one of a software program, an update to a software program, or a patch to a software program.

14. The computing device of claim 8, wherein determining the preferred application is further based on at least one of the amount of time that the applications that are present on the similar client devices and not on the target client device are used on the similar client devices and the frequency with which the applications that are present on the similar client devices and not on the target client device are used on the similar client devices.

15. A non-transitory computer readable storage medium comprising one or more sequences of instructions, the instructions when executed by one or more processors causing the one or more processors to execute the operations of:
    selecting a target client device on a network, the network comprising a plurality of client devices centrally managed by a server, the server containing a library of official application layers, each official application layer relating to a corresponding application, wherein merging the official application layer onto a client device applies the corresponding application onto the client device, wherein the official application layers are captured from the plurality of client devices by the server and stored in the library;
    identifying a group of similar client devices to the target client device on the network, the identifying the group of similar client devices comprising:
        identifying a set of applications on the target client device that are used on the target client device with a minimum frequency;
        identifying client devices in the plurality of client devices that use the applications in the identified set of applications with at least as high frequency as the minimum frequency;
    determining which application of the applications for which corresponding official application layers are contained in the library is a preferred application for being installed on the target client device based on which applications are present on the similar client devices, wherein the preferred application is present on at least a subset of the group of similar client devices and is not present on the target client device; and
    transmitting a message to the target client device, the message indicating which application out of the applications for which corresponding official application layers are contained in the library on the server is the preferred application for being installed on the target client device.

16. The non-transitory computer readable storage medium of claim 15, wherein identifying a group of similar client devices to the target client device on the network further comprises:
    identifying a set of characteristics related to the target client device; and
    identifying similar client devices based on the identified set of characteristics.

17. The non-transitory computer readable storage medium of claim 16, wherein the set of characteristics includes at least one of information about which applications are on the target client device, information about the amount of time applications are used on the target client device, and information about the frequency with which applications are used on the target client device.

18. The non-transitory computer readable storage medium of claim 16, wherein the set of characteristics includes profile information about the target client device.

19. The non-transitory computer readable storage medium of claim 15, further storing instructions that, when executed by the one or more processors, cause the one or more processors to execute the operations of:
    receiving a confirmation from the target client device to install the preferred application; and
    in response to receiving the confirmation, merging the official application layer on the target client device.

20. The non-transitory computer readable storage medium of claim 15, wherein an application is one of a software program, an update to a software program, or a patch to a software program.

* * * * *